United States Patent
Matsuura et al.

(10) Patent No.: US 8,691,218 B2
(45) Date of Patent: Apr. 8, 2014

(54) VERMIN EXTERMINATION USING LYSOZYME, SALT OR BIOLOGICAL FRAGMENT THEREOF, OR LYSOZYME-RELATED PEPTIDE AS AN EGG RECOGNITION PHEROMONE

(75) Inventors: Kenji Matsuura, Okayama (JP); Takashi Tamura, Okayama (JP); Norimasa Kobayashi, Okayama (JP)

(73) Assignee: National University Corporation Okayama University, Okayama (JP)

( * ) Notice: Subject to any disclaimer, the term of this patent is extended or adjusted under 35 U.S.C. 154(b) by 835 days.

(21) Appl. No.: 12/449,491

(22) PCT Filed: Feb. 15, 2008

(86) PCT No.: PCT/JP2008/052492
§ 371 (c)(1),
(2), (4) Date: Aug. 11, 2009

(87) PCT Pub. No.: WO2008/099910
PCT Pub. Date: Aug. 21, 2008

(65) Prior Publication Data
US 2010/0028323 A1   Feb. 4, 2010

(30) Foreign Application Priority Data
Feb. 15, 2007 (JP) .................... 2007-035030

(51) Int. Cl.
| | | |
|---|---|---|
| *A01N 25/00* | (2006.01) | |
| *A01N 25/08* | (2006.01) | |
| *A01N 25/24* | (2006.01) | |
| *A01N 25/32* | (2006.01) | |
| *A61K 38/43* | (2006.01) | |
| *A61K 38/47* | (2006.01) | |

(52) U.S. Cl.
USPC ....... 424/94.1; 424/94.61; 424/405; 424/406; 424/407; 424/410

(58) Field of Classification Search
CPC ....... A01N 25/00; A01N 25/32; A01N 25/24; A01N 25/08; A61K 38/43; A61K 38/47
USPC .................. 424/94.1, 94.61, 405, 406–410
See application file for complete search history.

(56) References Cited

FOREIGN PATENT DOCUMENTS

JP    2000-342149   12/2000

OTHER PUBLICATIONS

K. Matsuura et al., "The Antibacterial Protein Lysozyme Identified as the Termite Egg Recognition Pheromone", PLoS ONE, vol. 2, No. 8, pp. 1-16, Aug. 2007.
A. Fujita et al., "The Function of Lysozyme in a Japanese Dump-Wood Termite, *Reticulitermes speratus*", Zoological Science, vol. 18, Supplement, p. 59, Dec. 2001.
K. Matsuura et al., "Symbiosis of a Termite and a Sclerotium-Forming Fungus: Sclerotia Mimic Termite Eggs", Ecological Research, vol. 15, No. 4, pp. 405-414, 2000.
K. Matsuura et al., "Symbiotic Relationship between *Reticulitermes speratus* and *Sclerotium* sp.—Fungi Mimicking the Eggs of Termites", Dai 43 Kai Oyo Dobutsu Konchyu Gakkai Taikai Koen Yoshi, p. 74, 1999, D106 and its English translation.
"Termites and Strategies of Extermination", The Japan Termite Control Association, pp. 218-220, 2000, and its English translation.
T. Yoshimura et al., "Activity Evaluation of Japanese Underground Termites using Monitoring Station and Their Control with Bait Method", New Developments of Monitoring Technique of Insect Ecology in a Living Zone, pp. 48-53, 2006 and its English translation.
Second Office Action dated Feb. 23, 2011 issued in the corresponding Chinese Patent Application No. 200880004600.8 with English translation.
Office Actions dated Nov. 6, 2007 and Feb. 26, 2008 issued in the corresponding Japanese Patent Application No. 2007-035030 with its English Summary.
Office Action dated Aug. 11, 2010 issued in the corresponding Chinese Patent Application No. 200880004600.8 (with English translation).
Australian Office Action mailed May 28, 2012 in corresponding Australian Application No. 2008215434.
Supplementary European Search Report dated Nov. 15, 2012 in corresponding EP Application No. 08711322.1.

*Primary Examiner* — Debbie K Ware
(74) *Attorney, Agent, or Firm* — Wenderoth, Lind & Ponack, L.L.P.

(57) ABSTRACT

The present invention provides a mimetic egg comprising lysozyme, a salt or biological fragment thereof or a lysozyme-related peptide and an active ingredient in its base material mimicking an egg of a vermin; and a vermin exterminating method using the mimetic egg.

4 Claims, 1 Drawing Sheet

VERMIN EXTERMINATION USING LYSOZYME, SALT OR BIOLOGICAL FRAGMENT THEREOF, OR LYSOZYME-RELATED PEPTIDE AS AN EGG RECOGNITION PHEROMONE

This application is a U.S. national stage of International Application No. PCT/JP2008/052492 filed Feb. 15, 2008.

TECHNICAL FIELD

The present invention relates to a new mimetic egg for exterminating and preventing vermin, particularly, termites, a method for vermin extermination and prevention using the same, and so forth.

BACKGROUND ART

For the vermin extermination, various methods have been developed so far. In particular, termites cause enormous damage to wooden houses, and therefore, extermination agents and extermination methods of vermin have been researched and developed in the world. The methods for exterminating termites include a method of injecting a solution agent such as an organophosphorus agent, a carbamate agent, or a pyrethroid agent into invasion places to kill the insects, or a method of performing smoking by methyl bromide or the like to kill the insects (see, for example, Non-patent Document 1).

As an alternative method of a method of spraying an agent, there is bait method in which a slow-acting insecticidal active ingredient is mixed in a bait and the bait is fed to termites and thereby exterminating the termites (see, for example, Non-patent Document 2).

Conventional extermination techniques are basically to throw an agent in large quantity from the outside of the damaged wood to kill the insect. However these techniques lead to health damage such as sick building syndrome or to environmental pollution. Moreover, there is a problem that if some of colonies of termites remain, the damage is made to spread to another place. The most serious problem is that the labor cost required for the extermination is too much. Fumigation techniques using methyl bromide have been frequently carried out, however methyl bromide is a causative substance of the ozone layer destruction, and in recent years, trend of trying to regulate the use of methyl bromide has increased.

As an effective method for exterminating ants which organize a social life in the same manner as in termites, there is a method of mixing a favorite food of ants into a poison and providing the mixed food as a bait to allow the ants to bring the food to their nests and killing the entire population of the ants. However, because termites eat the wood itself in which the nest is built, the bait method for allowing the termites to convey an agent from the outside of the nest to the inside of the nest by using a poison bait is not always effective. In particular, it is difficult to eradicate the nest of *Reticulitermes speratus* by the bait method (see, Non-patent Document 2).

As a method for making vermin to ingest active ingredients more efficiently than bait method, "a method for exterminating vermin by conveyance of mimetic eggs" has been developed (Patent document 1) in which egg conveyance instinct that is basic social behavior of the vermin is utilized. The vermin in this method were termites. However, in this method, it has been possible to make termites to convey mimetic eggs by using crude extracted ingredients extracted from eggs of termites, however the egg recognition pheromone has not been identified. Unless the egg recognition pheromone is identified and can be produced largely and inexpensively, there has been a large problem of the cost for carrying out such a method.

In particular, if the vermin are termites, the extermination is difficult by the reason described below, and a conclusive solution has not been found yet.

Because termites make their habitat in a closed space, in a wood, it is difficult to infiltrate an agent from the outside.

Because the termites organize social lives, if some of colonies remain, the termites move and make the damage expanded.

Because termites live by eating the wood itself in which they make their habitat, introduction of a poison bait is not effective.

Patent document 1: JP 2000-342149 A

Non-patent Document 1: "Termites and strategies of extermination", The Japan Termite Control Association, 2000, p. 219

Non-patent Document 2: "Activity evaluation of Japanese underground termites using a monitoring station and the extermination by bait methods", New developments of monitoring technique of insect ecology in a living zone, 2006, p. 48

DISCLOSURE OF INVENTION

Problems to be Solved by the Invention

With conceiving the above circumstances, the present inventors have intensively studied to identify the egg recognition pheromone of vermin, particularly, termites in order to make the method for exterminating vermin using the conveyance of mimetic eggs more effective and more inexpensively provided. The present inventors has found that the egg recognition pheromone of termites is lysozyme, which is a kind of antibacterial proteins, and that the termites recognize eggs comprising lysozyme, and convey and protect the eggs in a growth room of the nest. Thus, the present inventors have completed the present invention.

Means to Solve the Problems

That is, the present invention relates to the follows:

(1) A mimetic egg comprising lysozyme, a salt or biological fragment thereof or a lysozyme-related peptide as an egg recognition pheromone and an active ingredient in its base material mimicking an egg of a vermin;

(2) The mimetic egg according to (1), wherein the active ingredient is one or more compounds selected from the group consisting of an insecticidal ingredient, a hatch-inhibiting substance, a reproduction-inhibiting substance, and a growth-inhibiting ingredient;

(3) The mimetic egg according to (1) or (2), wherein the active ingredient is slow-acting;

(4) The mimetic egg according to any one of (1) to (3), wherein the base material is made of a sustained-release material;

(5) The mimetic egg according to (4), wherein the base material is degraded by saliva of the vermin;

(6) The mimetic egg according to (4) or (5), wherein the base material has a capsule shape, and the active ingredient is included therein;

(7) The mimetic egg according to any one of (1) to (6), wherein the base material comprises glycerol and/or cellulase;

(8) The mimetic egg according to any one of (1) to (7), wherein the base material comprises an ingredient extracted from an egg of the vermin;

(9) The mimetic egg according to any one of (1) to (8), wherein the vermin is a termite;

(10) A method for exterminating vermin, which comprises providing the mimetic egg according to any one of claims 1 to 9 to the vermin, and making the vermin to convey the mimetic egg into their nest using egg conveyance behavior;

(11) Use of lysozyme, a salt or biological fragment thereof, or a lysozyme-related peptide as an egg recognition pheromone of vermin.

Effect of the Invention

According to the present invention, a mimetic egg comprising lysozyme, a salt or biological fragment thereof or a lysozyme-related peptide as an egg recognition pheromone and an active ingredient in its base material mimicking an egg of a vermin can be produced in a large scale and inexpensively. And extermination or prevention of vermin, particularly termites can be performed effectively, simply, and inexpensively.

BEST MODE FOR CARRYING OUT THE INVENTION

Figure 1:
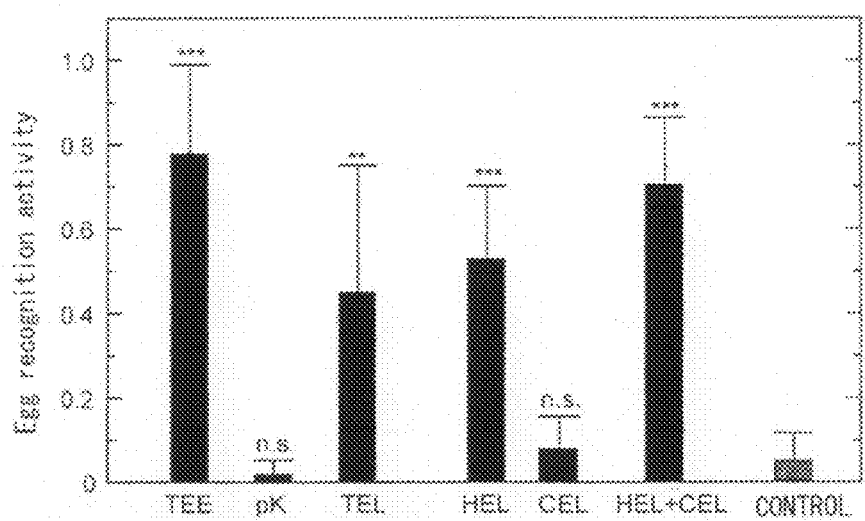
FIG. 1 shows a result of investigation of egg recognition activity of lysozyme by termites. The abbreviations indicate as follows; TEE: termite egg extract, pK: termite egg extract degraded by proteinase, TEL: lysozyme isolated from termite egg extract, HEL: egg white lysozyme, CEL: cellulase, HEL+CEL: mixed solution of egg-white lysozyme and cellulase. n.s.: no significant difference from the control. : there is a significant difference with a significant level of 1%. *: there is a significant difference with a significant level of 0.1% (two-sided T test).

Insects such as termites which have a characteristic of conveying eggs have characteristics of taking care of the eggs by conveying and stacking the eggs in their nest and licking the surfaces of the eggs and so forth, or performing trophallaxis between individuals. By utilizing such characteristics, the vermin can be exterminated or prevented. For example, termites recognize mimetic eggs having a size and a shape similar to the natural eggs, and comprising the egg recognition pheromone on the surfaces thereof, as natural eggs, and convey the mimetic eggs into their egg mass in the nest. Consequently, the termites perform care behaviors such as licking the surface of the mimetic egg and perform trophallaxis between individuals. Accordingly, reproduction center of colonies can be destroyed efficiently by making the mimetic eggs comprise an active substance, for example, an active ingredient such as an insecticidal ingredient, a hatch-inhibiting substance, a reproduction-inhibiting substance, or a growth-inhibiting ingredient, and making the termites to convey the mimetic eggs into the egg mass.

The present inventors have repeatedly studied intensively to identify the egg recognition pheromone of termites. The egg recognition pheromone of termites that is purified and isolated by ion-exchange chromatography and hydrophobic chromatography has been subjected to an accurate mass analysis, and it has been revealed that the egg recognition pheromone is a protein having a molecular weight of about 14.5 kDa. Furthermore, because the active ingredient showed a high bacteriolytic activity, it has been suggested that the egg recognition pheromone of termites is lysozyme, which is a kind of antibacterial proteins. Based on the findings, the egg recognition activity of termites has been determined for the samples of lysozyme derived from chicken egg white, and a high activity has been recognized. Accordingly, it has been revealed that the egg recognition pheromone of termites is lysozyme.

Accordingly, in a first aspect, the present invention provides a mimetic egg comprising lysozyme, a salt or biological fragment thereof or a lysozyme-related peptide as an egg recognition pheromone and an active ingredient in its base material mimicking an egg of a vermin.

The vermin that can be exterminated by the mimetic eggs and the method of the present invention may be any vermin as long as they have an egg conveyance instinct and recognize lysozyme as the egg recognition pheromone. The vermin to which the mimetic eggs and the method of the present invention are preferably applied are termites. The termites exterminated by the present invention may be any kinds of termites, and termites not only in Japan but also in the world can be targeted. Typical termites that are exterminated by the present invention include termites such as *Reticulitermes* and *Coptotermes*, but are not limited thereto. In the present specification, extermination of vermin includes preventing the vermin. In the present specification, the vermin are insects causing harmful effects on human, farm animal, farm products, assets, and so forth.

The egg recognition pheromone of the present invention is lysozyme, a salt or biological fragment thereof, or a lysozyme-related peptide. Lysozyme may be derived from any species of organisms, for example, may be derived from mammals, avian species such as chicken, fish, reptiles, amphibian, insects such as silkworm, and so forth. The preferable lysozyme that can be obtained in a large scale and inexpensively and can be used in the present invention includes lysozyme derived from chicken egg white. Moreover, the lysozyme derived from the termite egg extract may be used in the present invention. The lysozyme used in the present invention may be purified or not purified. Furthermore, the lysozyme used in the present invention may be produced by a genetic recombination method. The production of protein, polypeptide, or peptide by a genetic recombination method is well known to those skilled in the art. In general, the gene of a desired protein is connected to a vector and is introduced into an appropriate host cell such as *Escherichia coli* or yeast, and by proliferating the cell, the desired protein can be obtained. The type of the vector or the host cell, a vector introduction condition, the culture condition of the host cell, a method of separating and purifying the desired protein, and so forth can be appropriately selected from known materials and known methods by those skilled in the art.

The lysozyme used in the present invention may be a form of a salt. The lysozyme salt may be a salt with every substance that can form a salt, for example, a salt with an organic acid, a salt with an inorganic acid, a salt with an organic base, or a salt with an inorganic base. Moreover, for example, β- or γ-carboxyl group of asparagine or glutamine constituting the lysozyme and a metal such as sodium or potassium may form a salt. Moreover, for example, a salt may be formed with a side chain of a basic amino acid constituting the lysozyme. In the present invention, a biological fragment of lysozyme or a lysozyme-related peptide may have a form of a salt.

Furthermore, in the present invention, the biological fragment of lysozyme may be used as the egg recognition pheromone. The biological fragment of lysozyme is a polypeptide or a peptide having a partial amino acid sequence of lysozyme and having similar egg recognition activity to lysozyme. The fragment is a short chain, and therefore, is suitable for large-scale production by a genetic recombination method.

Furthermore, in the present invention, the lysozyme-related peptide may be used as the egg recognition pheromone. The lysozyme-related peptide is a protein, a polypeptide, or a peptide having similar egg recognition activity to lysozyme and being different from lysozyme and the biological fragment of lysozyme. The lysozyme-related peptide may be derived from natural source or may be a synthetic compound. The lysozyme-related peptide may have an amino acid sequence different from the natural lysozyme by a technique such as site-directed mutagenesis method. For example, lysozyme, a biological fragment thereof, or a lysozyme-related peptide having an amino acid sequence that is more favored by termites may be produced and used in the present invention. Moreover, for example, lysozyme, a biological fragment thereof, or a lysozyme-related peptide having an amino acid sequence having a high specificity to termites of a specific kind may be produced and used in the present invention.

It is necessary that the mimetic eggs of the present invention have shapes, sizes, and characteristics analogous to the shapes, sizes, and characteristics of the eggs of the vermin to be exterminated. The form and size of the mimetic eggs used in the present invention can be produced by mimicking the form and size of the actual eggs of the vermin. In the case of termites, the form of the mimetic eggs can be a long-egg shape or a spherical shape. In the case of the mimetic egg having a long-egg shape, it is preferable that its short diameter is approximately the same as or slightly larger than the short diameter of the eggs of termites to be exterminated. For example, when the short diameter of the long-egg-shaped termite egg is about 0.25 to about 0.45 millimeter, the short diameter of the long-egg-shaped mimetic egg of termites may be about 0.25 to about 0.6 millimeter, preferably, about 0.4 to about 0.55 millimeter, and further preferably, about 0.45 millimeter. Moreover, in the case of the sphere-shaped mimetic egg of termites, it is preferable that its diameter is approximately the same as or slightly larger than the short diameter of the eggs of termites to be exterminated. For example, when the short diameter of the spherical termite egg is about 0.25 to about 0.45 millimeter, the diameter of the spherical mimetic egg of termites may be about 0.25 to about 0.6 millimeter, preferably, about 0.4 to about 0.6 millimeter, and further preferably, about 0.45 to about 0.55 millimeter. From the point of easy formation, the spherical mimetic egg is preferable.

It is necessary that not only the physical property such as shape and size as described above and weight or hardness but also the chemical property, particularly, the egg recognition pheromone of the mimetic egg of the present invention are same as or similar to those of the natural egg of the vermin. That is, it is necessary that when the base material of the mimetic egg comprises lysozyme, a biological fragment thereof, or a lysozyme-related peptide, these substances appear on the surface of the base material.

The base material of the mimetic egg of the present invention may be any material which can produce the mimetic egg having similar shape and characteristic to those of the natural egg of the vermin. The base material preferable for production of the mimetic egg of the present invention includes thermoplastic resins such as polyethylene, polypropylene, polystyrene, polyester, polyvinyl chloride, and polycarbonate, thermosetting resins such as urea resins, epoxy resins, phenol resins, and polyurethane, porous materials such as silica gel and zeolite, ceramics, glass or the like.

The base material comprises lysozyme, a salt or biological fragment thereof, or a lysozyme-related peptide, and an active ingredient, and thereby, the mimetic egg of the present invention is produced. Many methods for making these substances comprised in the base material are known to a skilled person in the art. In producing the base material, these substances may be mixed therein, or after producing the base material, these substances may be comprised in the base material. For example, in producing the base material, these substances may be mixed or kneaded therein, or the produced base material may be covered, immersed, coated, or splayed with these substances. Moreover, because methods for immobilizing a protein, a polypeptide, or a peptide to a solid support are known, these methods may be applied thereto. The immobilizing method includes an adsorption method, a covalent bond method, an ionic bond method, an encapsulation method or the like.

The amount of lysozyme, a salt or biological fragment thereof, or a lysozyme-related peptide applied to the base material of the mimetic egg of the present invention can be easily determined by those skilled in the art depending on various factors such as species (source organism), physicochemical property or the like, kinds of the vermin, a kind or amount of the active substance, and a kind or degree of the desired effect (see, for example, Examples of the present application).

Preferably specific embodiments of the mode of making the base material to comprise lysozyme, a salt or biological fragment thereof, or a lysozyme-related peptide, and an active ingredient include a surface-coating mode, a base material addition mode, a capsule dissolution mode and the like. In an example of the surface-coating mode, an active ingredient is coated on the surface of a base material, and lysozyme, a salt or biological fragment thereof, or a lysozyme-related peptide is coated thereon. In an example of the base material addition mode, on the surface of a base material in which an active ingredient is mixed, lysozyme, a salt or biological fragment thereof, or a lysozyme-related peptide is coated. In an example of the capsule dissolution mode, a film-shaped base material is formed into a capsule shape base material, and an active ingredient is sealed therein, and on the surface of the base material, lysozyme, a salt or biological fragment thereof, or a lysozyme-related peptide is coated.

The active substance that can be used for the mimetic egg and the exterminating method of the present invention may be any substance which can accomplish extermination or prevention of the vermin. For example, the active substance may disturb behavior of the vermin and thereby leading to destruction of the colony. The active substance suitable for extermination or prevention of the vermin includes an insecticidal ingredient, a hatch-inhibiting substance, a reproduction-inhibiting substance, or a growth-inhibiting ingredient. A Kind and an amount of the active substance that can be used for the mimetic egg and the method of the present invention can be selected considering various factors such as the kind of the active substance or the kind of the vermin and the kind or the degree of the desired activity (damage to be given to the vermin). In general, the kind and the amount of the active substance are selected so that the desired effect can be sufficiently exerted to the target vermin. However, the selection is also done so that the conveyance rate of the mimetic egg of the vermin will not be decreased and so that adversely affect to the humans and circumjacent farm animals or beneficial insects will not be produced by using the mimetic eggs and the method of the present invention.

One kind of, or two or more kinds of the active ingredient may be used for the mimetic eggs and the extermination method of the present invention. The insecticidal ingredients such as pyrethroid compounds, organophosphorus compounds, carbamate compounds, N-aryldiazole compounds, hydrazone compounds, sulfonamide compounds, or natural insecticidal ingredients can be used. Additionally, insect growth regulators such as chitin synthetic inhibitors, juvenile hormone-like active compounds, and molting hormone-like active compounds can be used as the active ingredients. It goes without saying that the active ingredient that can be used in the present invention is not limited to the above compounds.

In the mimetic eggs of the present invention, it is preferable that the active ingredient is slow-acting. As described above, the vermin such as termites recognize the mimetic eggs having a size and a shape similar to the natural eggs and comprising the egg recognition pheromone in the surface thereof, and convey the mimetic eggs into their egg mass in the nest. The vermin ingest the active ingredient through care behaviors such as licking the surface of the mimetic egg. When some individuals of the colony ingest the active ingredient, the active ingredient pervades the entire colony through high-frequent trophallaxis by stomodeal food and proctodeal food. Accordingly, the preferable active ingredient used in the present invention does not exert the effect at the time of conveying the mimetic eggs or immediately after ingestion by the vermin. Or the preferable active ingredient exerts the effect at an extent of not affecting the behavior such as the mimetic egg conveyance or trophallaxis, and exerts the effect after the mimetic eggs are conveyed into the nest and the trophallaxis is performed among many individuals. By using such a slow-acting active ingredient, many individuals in the targeted colony can be efficiently exterminated, and the usage amount of the active ingredient is small. Accordingly, influence on other ecological systems is small. The slow-acting active ingredient that can be used for the mimetic eggs of the present invention includes not only a slow-acting insecticidal ingredient such as hydramethylnon but also a slow-acting hatch-inhibiting ingredient, a slow-acting reproduction-inhibiting ingredient, and a slow-acting growth-inhibiting ingredient, but not limited thereto.

In the mimetic eggs of the present invention, it is also preferable that the base material is made of a sustained-release material. The mimetic eggs of which base material is made of a sustained-release material are preferable, and thereby, the mimetic egg is conveyed into the nest and then the active substance is gradually released and taken in by the vermin. Such mimetic eggs include eggs made of a material that can be degraded by saliva of the vermin. Preferably, the active ingredient is comprised inside the base material (by interfusion, blend, filling, or the like). The mimetic eggs are conveyed into the nest and then the base material is degraded by saliva of the vermin. Thus the inside active ingredient is released. In particular, in the above base material addition mode or the capsule dissolution mode or the like, it is preferable to use the base material that can be degraded by saliva of the vermin. The material of the base material that can be degraded by saliva of the vermin can be selected depending on a kind of the digestive enzyme in the saliva of the vermin. For example, when cellulase is comprised in the saliva of the vermin, the base material made of cellulosic material can be used.

The particularly preferable type of the mimetic egg of the present invention is the capsule dissolution type above mentioned. Specifically, a film-shaped base material comprising lysozyme, a salt or biological fragment thereof, or a lysozyme-related peptide is formed into a shape similar to an actual egg (that is, to be a capsule form), and the active ingredient is comprised inside the capsule. Thus, the mimetic egg of the present invention can be produced. The method of forming such a capsule is known to those skilled in the art. Examples of the material of the film include an oxide film and a cellulose film and so forth. It is preferable that the film-shaped base material has a sustained-release property, and it is preferable to use, for example, a cellulose film that can be degraded by saliva of the vermin. The mimetic eggs produced by such a capsule sealing mode are also suitable for extermination of large colonies in a field.

The mimetic eggs comprising the base material made of such a sustained-release material are also effective in case that the active substance is slow-acting, and are particularly effective in case that the active substance is not slow-acting.

It is also preferable that glycerol and/or cellulase is comprised in the base material in order to maintain the activity of lysozyme, a salt or biological fragment thereof, or a lysozyme-related peptide as the egg recognition pheromone in the mimetic eggs of the present invention, and to hold it on the surface of the base material. A highly purified glycerol or cellulase is not necessarily used. The content of glycerol or cellulase in the base material can be determined depending on various factors such as the kind, the characteristic, the amount, etc of the lysozyme to be used, the kind of the vermin, the kind or the amount of the active substance, and the kind or the extent of the desired effect.

Moreover, it is also preferable that the base material of the mimetic egg of the present invention comprises a component extracted from eggs of the targeted vermin. Thereby, higher egg conveyance effect can be obtained. The crude extract from the eggs may be comprised in the base material, or the purified extract may be comprised in the base material. The content of the crude extract or purified product thereof in the base material can be determined depending on various factors such as the kind, the characteristic, the amount, etc of the lysozyme to be used, the kind of the vermin, and the kind or the extent of the desired effect. Methods of extracting and purifying an effective ingredient from eggs are known in the art and can be used.

In another aspect, the present invention provides a method for exterminating vermin, which comprises providing the above mentioned mimetic egg to the vermin. The vermin that are exterminated or prevented by the method of the present invention may be any vermin as long as they have an egg conveyance instinct and recognize lysozyme as the egg recognition pheromone. The vermin to which the extermination method of the present invention is preferably applied are termites. For example, in case of exterminating termites, the mimetic eggs of the present invention can be put on a part of an ant road or a nest material. It is possible that holes are opened on an ant road by a drill and the mimetic eggs of the present invention are injected into them. It is possible that the mimetic eggs of the present invention are enveloped in a protective film such as cellophane and thereby durability is held in the field. In this case, a ingestion-promoting substance such as a wood extract solution or a rotten wood extract solution may be added to the protective film. It is also effective to use a monitoring station for the vermin extermination method of the present invention.

The present invention will be described further specifically and in detail by the following Examples, but the Examples are for exemplification only and they are not intended to limit the present invention.

Example 1

Preparation of Mimetic Eggs and Confirmation of Egg Recognition Activity of Lysozyme Egg recognition activities of a termite egg extract, lysozyme purified from the termite egg extract, a termite egg extract degraded by proteinase, egg white lysozyme, cellulase, a mixture of egg white lysozyme and cellulase, and 30% glycerin aqueous solution as a control were investigated by using *Reticulitermes speratus* workers (worker termites).

Each test samples was prepared as follows.

800 μL of ultrapure water was added to 400 mg of *Reticulitermes speratus* eggs in an Eppendorf tube, and homogenized, and subjected to ultrasonic treatment for 5 minutes, and centrifugation was performed at 15,000 rpm for 30 minutes. The supernatant was lyophilized, and 5.0 mg of the lyophilized powder was dissolved in 100 μL of 30% glycerin aqueous solution (termite egg extract). The termite egg extract prepared in the same manner as described above was purified by BioRex 70 (BioRad Laboratories, CA, USA) cation-exchange resin, and further, lysozyme fractions were isolated by Q-1 column chromatography (BioRad Laboratories, CA, USA) and Methyl HIC column chromatography (BioRad Laboratories, CA, USA), and 1.0 mg of lyophilized powder thereof was dissolved in 20 μL of 30% glycerin aqueous solution (lysozyme isolated from termite egg extract). Proteinase (Proteinase K, Nacalai Tesque, Inc., Kyoto) was added to the termite egg extract prepared in the same manner as described above, and treated at 37° C. for 24 hours (termite egg extract degraded by proteinase). 2.0 mg of egg white lysozyme (SIGMA, St. Louis, Mo., USA) was dissolved in 10 μL of 30% glycerin aqueous solution (egg white lysozyme). 2.0 mg of cellulase (SIGMA, St. Louis, Mo., USA) was dissolved in 10 μL of 30% glycerin aqueous solution (cellulase). 10 mg of egg white lysozyme and 10 mg of cellulase were dissolved in 50 μL of 30% glycerin aqueous solution (mixed solution of egg white lysozyme and cellulase).

2.0 μL of each of the test samples was added to equal amounts of 100 glass beads each having a diameter of 0.5 mm and blended well and whereby the test sample was coated on the surface of the glass bead. The glass beads coated only with 30% glycerin aqueous solution were used as a control.

Figure 2:
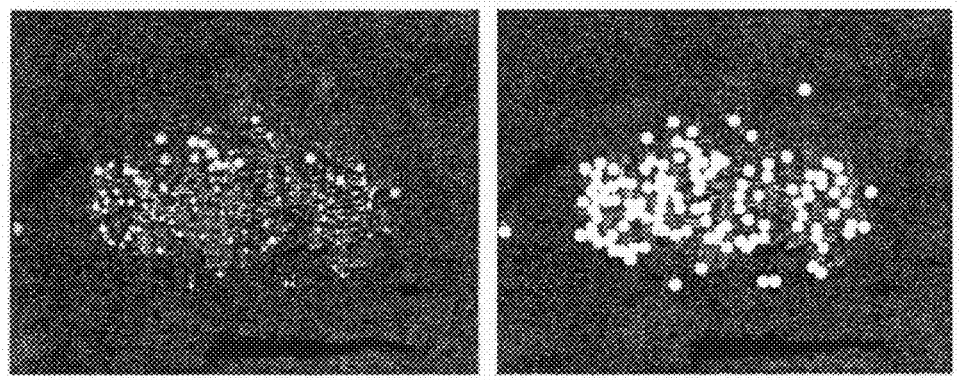
FIG. 2 shows photographs showing conveyance situation of mimetic eggs into an egg mass in case that mimetic eggs coated with a termite egg extract are provided to termites (left). White circles are appended to the mimetic eggs in order to clarify the mimetic eggs to have been carried (right).

10 eggs of termites and 20 mimetic eggs obtained by the above procedure were randomly put on a petri dish having a diameter of 30 mm, and 10 worker termites (workers) of *Reticulitermes speratus* were put therein, and the petri dish was allowed to stand for 24 hours in a constant temperature room of 25° C., and then, the conveyance ratio of mimetic eggs into the egg mass was investigated (the experiment was performed by the same procedure for each of the test samples). Nine experiments were repeated for each test. The conveyance ratio was converted into arcsine root, and statistical comparison with the control was performed by two-side T-test. In cases except for the termite egg extract degraded by proteinase and the control, the worker termites gathered the eggs scattered on the petri dish to form an egg mass and showed conservation behavior. The conveyance ratio of the mimetic eggs coated with each of the test samples into the egg mass is shown in FIG. 1. The photograph showing the conveyance situations of the mimetic eggs into the egg mass in a case where the mimetic eggs coated with the termite egg extract were provided to the termites is shown as FIG. 2.

Example 2

Introduction of Mimetic Eggs into Colonies in the Field Study

630 μL of 30% glycerin aqueous solution was added to 63 mg of a lyophilized egg extract of termites obtained in Example 1, and the solution was added to equal amounts of 31,500 glass beads each having a diameter of 0.5 mm and coating was performed. In red pine woods, a blighted and nested red pine tree material having matured colonies of *Reticulitermes speratus* was punched by a drill. All the mimetic eggs were divided into five portions and injected into five holes. After 48 hours, the nested material was completely dismantled, and all of the egg masses were taken out and the ratio of the mimetic eggs conveyed into the egg masses was investigated.

Out of 31,500 mimetic eggs injected into the nested material, 6,098 mimetic eggs were found in the egg masses. The introduction ratio of the mimetic eggs after 48 hours in the field was 19.35%. Into all of 60 egg masses found in this colony, the mimetic eggs were conveyed and the rate of conveying the mimetic eggs was 100%, which was extremely high.

Example 3

Introduction of Mimetic Eggs Carrying an Exterminating Agent into Colony Bred in a Petri Dish Equal amounts of 200 glass beads each having a diameter of 0.5 mm were blended in 40 μL of 30% glycerin aqueous solution containing 10 μg/μL of slow-acting insecticidal active substance hydramethylnon and 50 μg/μL of the termite egg extract, and coating was performed (coating 2 μg of hydramethylnon and 10 μg of the termite egg extract per bead). The mimetic eggs thus obtained were used as an exterminating agent. 200 mimetic eggs described above were provided to 100 workers of *Reticulitermes speratus* (worker termites) bred in 90 mm petri dish, and the workers were allowed to perform the egg conveyance and the egg protection, and the survival rate and the conveyance rate were investigated every 12 hours.

The above amount of hydramethylnon does not affect the conveyance activity, and high conveyance activity equal to that in case of only the termite egg extract was shown (conveyance rate was 80%). The worker termites groomed the mimetic egg carrying the exterminating agent in the same manner as their eggs, and hydramethylnon was taken in the termite bodies (hydramethylnon was colored with yellow, and the yellow-color became thin by grooming of termites). The survival rate was 100% after 12 hours, however after three days, the survival rate was 0% (that is, all of 100 workers died). From these results, it was concluded that hydramethylnon sufficiently spread in the colony and its efficacy was exerted by grooming and trophallaxis.

INDUSTRIAL APPLICABILITY

The present invention provides effective extermination of vermin, particularly termites. The present invention is available in the field of production of insecticides, the field of vermin extermination industry, the field of building industry, the field of landscape industry, and so forth.

The invention claimed is:

1. A mimetic egg comprising lysozyme, a salt or biological fragment thereof or a lysozyme-related peptide as an egg recognition pheromone, an active ingredient, and a base material mimicking an egg of a termite, wherein the lysozyme is the lysozyme obtained from chicken egg white.

2. The mimetic egg according to claim 1, wherein the active ingredient is one or more compounds selected from the group consisting of an insecticidal ingredient, a hatch-inhibiting substance, a reproduction-inhibiting substance, and a growth-inhibiting ingredient.

3. The mimetic egg according to claim 1, wherein the active ingredient is slow-acting.

4. A method for exterminating a termite, which comprises providing the mimetic egg according to claim 1 to the termite, and making the termite convey the mimetic egg into its nest using egg conveyance behavior.

* * * * *